Patented Nov. 13, 1928.

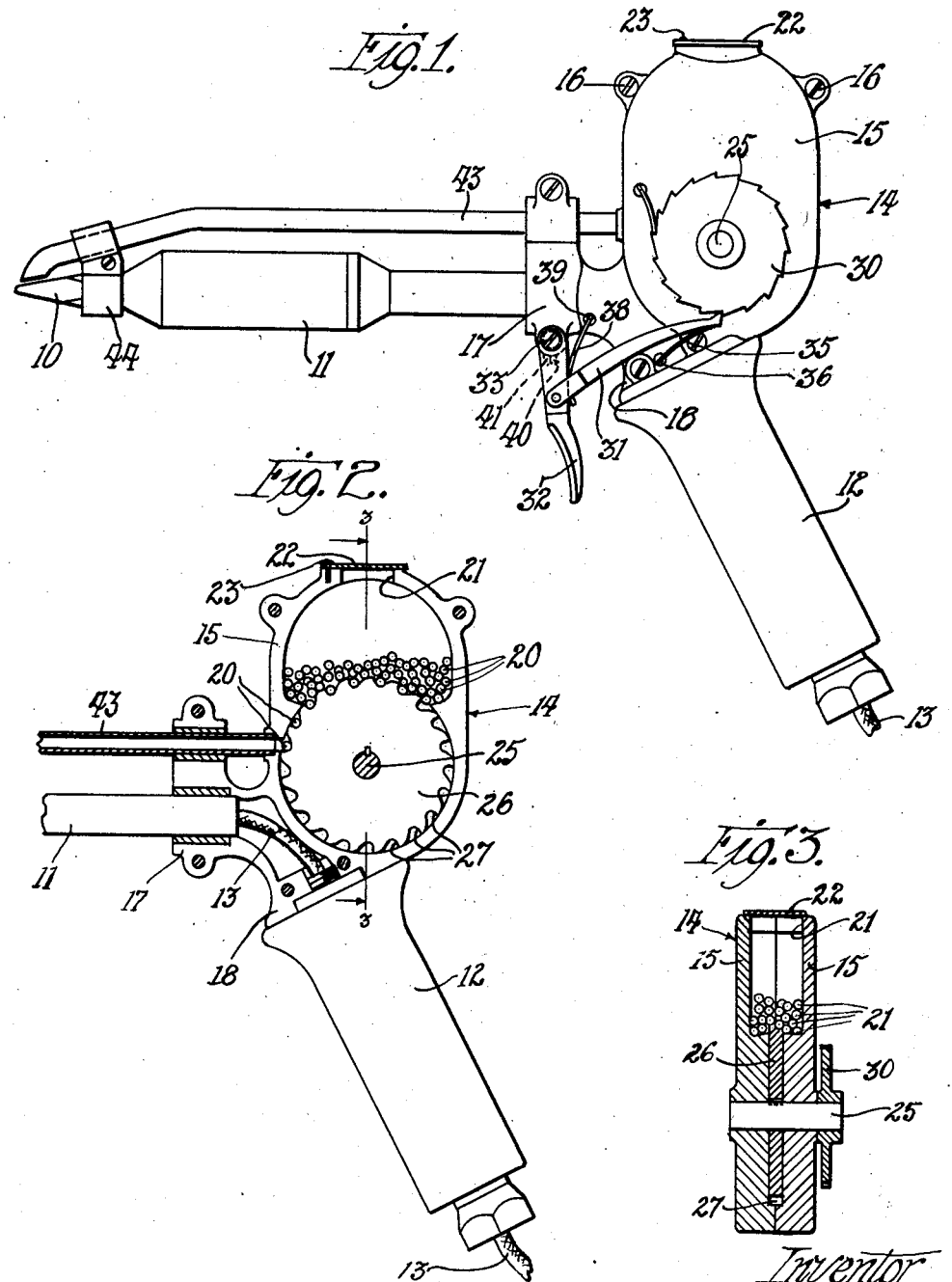

1,691,052

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

SOLDERING AND WELDING TOOL AND THE LIKE.

Application filed August 9, 1924. Serial No. 731,177.

This invention relates to soldering and welding tools and the like and more particularly to such tools having means for supplying soldering or welding material to the joint which is being produced.

Another object of the invention is to provide a tool of the character described having improved means whereby the substance or substances to be fused may be supplied to a certain portion of the tool.

A further object of the invention is to provide a tool of the character described so constructed that the operator can readily handle and operate it in an efficient manner.

One form of the invention is embodied in a soldering iron wherein solder is deposited in pellet form directly upon the outer surface of the heated end or tip. In accordance with another feature of the invention the handle is disposed at an angle with respect to the shank of the iron to enable the operator to manipulate the tool efficiently.

Other objects and features of the invention will become apparent as the detailed description progresses, reference being had to the accompanying drawing, wherein Fig. 1 is a side elevation of the improved soldering iron;

Fig. 2 is a fragmentary side elevation, partly in section, of the improved soldering iron, and Fig. 3 is a section taken on line 3—3 of Fig. 2.

Referring to the drawing, the reference character 10 designates the customary pointed head or tip of the improved soldering iron which also comprises a shank 11 and a handle 12. The handle 12 is disposed at an angle to the shank 11 and forms a pistol grip which enables the operator to manipulate the soldering iron in an efficient manner. A plurality of conductors 13 threaded through the handle 12 and the shank 11 provide means whereby the soldering iron may be connected to any suitable source of electrical energy so that a resistance element (not shown) in the tip 10 may be heated to bring the tip to the desired temperature.

Means are provided for supplying solder to the heated tip 10, the means comprising a hopper 14 formed by a pair of complementary members 15 secured to each other by bolts or screws 16. The complementary members 15 are provided with extensions 17 and 18 which are adapted to receive the shank 11 and the handle 12, respectively.

As clearly shown in Fig. 2 the hopper 14 is adapted to hold a supply of solder in pellet form, the pellets being designated by the reference character 20. The pellets 20 preferably comprise a core of fluxing material and are described in detail in my copending application, Serial No. 731,179, filed August 9, 1924. The pellets 20 are introduced into the hopper 14 by way of an aperture 21 normally closed by a plate 22 pivotally secured to the hopper by means of a screw 23.

Interposed between the complementary members 15 and rigidly keyed to a shaft 25 rotatably journaled in the members is a disc 26 having a plurality of notches 27 in its periphery. As shown, each notch 27 is adapted to receive and hold one of the pellets 20, means being provided to rotate the disc 26 in a counter-clockwise direction (Fig. 2) so that each of the notches 27 may be supplied with a pellet 20. The means for rotating the disc 26 comprises a ratchet 30 secured to the shaft 25 and adapted to be rotated in a step-by-step manner by a pawl 31 pivotally secured to a lever or trigger 32, the trigger 32 being pivotally secured by a screw 33 to the extensions 17. A leaf spring 35 secured to one of the extensions 18 by a pin 36 tends to hold the pawl 31 in engagement with the ratchet 30. A leaf spring 38 mounted upon one of the extensions 17 by means of a pin 39 tends to hold the trigger 32 in a position wherein a lug 40 projecting from the trigger rests against a lug 41 formed upon the extension 17. It is apparent that if the trigger 32 is oscillated the disc 26 will be rotated intermittently to cause the notches 27 to register successively with one end of the tube 43 which has its outer end disposed in close proximity to the outer surface of the heated tip 10. The tube 43 is mounted in the extensions 17 and in a bracket 44.

In the operation of the device the operator grasps the handle 12 in one of his hands and employs the index finger of that hand to operate the trigger 32; this leaves his other hand free to handle the work. When solder is to be supplied to the heated tip 10 the soldering iron is held in a position wherein the tube 43 is inclined downwardly. The trigger 32 is then drawn toward the handle 12 to cause one of the notches 27 holding a pellet 20 to be aligned with the inner end of the tube 43. The pellet 20 then rolls through the tube 43 to the outer surface of the heated tip 10 which fuses it so that it may be employed in the soldering operation. It is obvious that the soldering operations may follow each other in close succession and that the operator can handle and operate the improved tool with a minimum of effort as the relative positions of the shank, handle and trigger are such that the operator is not required to hold the tool in an awkward position at any time, nor is it necessary to employ both hands at any time to actuate the means for supplying the pellets of solder to the heated tip of the iron.

What is claimed is:

1. The combination with a tool having a member capable of receiving heat, of means for holding a supply of matter in pellet form, rotatable means for receiving and withdrawing a pellet of said matter from said first mentioned means, and means disposed outside of the tool member for receiving said pellet from the rotatable means and for depositing it upon the outer surface of the tool member.

2. The combination with a tool having a member capable of receiving heat, of means for holding a supply of matter in pellet form, rotatable means for receiving and withdrawing the pellets from said first mentioned means, and a passage terminating alongside of the tool member for leading the pellets for the rotatable means to the outer surface of said tool member.

3. The combination with a tool having a member capable of receiving heat, of a hopper for holding a supply of pellets of fusible matter, a passage leading from the hopper to the outer surface of the tool member, rotatable means for receiving pellets and for feeding a predetermined number of said pellets into the passage, and means for rotating said last mentioned means in a step-by-step manner.

4. The combination with a tool having a tip capable of being heated, means for holding a supply of matter, a pistol grip on the tool, rotatable means for receiving and separating a quantity of said matter, and means including an actuating trigger member operatively disposed with respect to the grip for actuating the rotatable means to supply matter to the outer surface of the tip.

5. The combination with a tool having a member capable of receiving heat, of a hopper for holding a supply of spherical pellets of solder, a tube disposed above the tool and leading from the hopper to the upper outer surface of the tool member, a rotatable member having a plurality of peripheral pellet receiving openings for selectively separating individual pellets from remaining pellets in the hopper and feeding the separated pellets individually in spaced relation to the tube, a grip for the tool disposed beneath the hopper and the rotatable member, a trigger member operatively disposed with respect to the grip, a ratchet connected with the rotatable member, and a pawl carried by the trigger member for operatively engaging the ratchet to rotate the member.

In witness whereof, I hereunto subscribe my name this 31 day of July A. D., 1924.

JOSEPH WILLIAM FAY.